United States Patent
Ling et al.

(10) Patent No.: US 12,545,088 B2
(45) Date of Patent: Feb. 10, 2026

(54) COOLING STRUCTURE OF INTEGRATED ELECTRIC DRIVE SYSTEM AND INTEGRATED ELECTRIC DRIVE SYSTEM

(71) Applicant: BYD COMPANY LIMITED, Guangdong (CN)

(72) Inventors: Heping Ling, Shenzhen (CN); Zhen Zhai, Shenzhen (CN); Linna Liu, Shenzhen (CN); Yun Liang, Shenzhen (CN); Yuchao Xiong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 238 days.

(21) Appl. No.: 18/141,044

(22) Filed: Apr. 28, 2023

(65) Prior Publication Data

US 2023/0264553 A1    Aug. 24, 2023

Related U.S. Application Data (63) Continuation of application No. PCT/CN2021/127073, filed on Oct. 28, 2021.

(30) Foreign Application Priority Data

Oct. 30, 2020 (CN) .......................... 202011195481.8

(51) Int. Cl.
*B60K 1/00* (2006.01)
*H02K 5/20* (2006.01)
*H02K 9/193* (2006.01)

(52) U.S. Cl.
CPC ............... *B60K 1/00* (2013.01); *H02K 5/203* (2021.01); *H02K 9/193* (2013.01); *B60K 2001/006* (2013.01)

(58) Field of Classification Search
CPC ........ B60K 2001/003; B60K 2001/006; B60Y 2400/61; B60Y 2410/10; H02K 1/32;
(Continued)

(56) References Cited

U.S. PATENT DOCUMENTS 2,706,260 A    4/1955 Heintz
5,589,720 A    12/1996 Berger
(Continued)

FOREIGN PATENT DOCUMENTS

CN    106953467 A    7/2017
CN    106981943 A    7/2017
(Continued)

OTHER PUBLICATIONS

International Search Report and Written Opinion for Application No. PCT/CN2021/127073, mailed on Jan. 19, 2022, 8 pages.

*Primary Examiner* — Christopher M Koehler
*Assistant Examiner* — Ethan Nguyen Vo
(74) *Attorney, Agent, or Firm* — Sheppard Mullin Richter & Hampton LLP (57) ABSTRACT

A cooling structure for a drive system, includes a motor assembly. The motor assembly includes a rotary shaft and a cooling tube having an inner hole. The rotary shaft includes a mounting hole for receiving the cooling tube. An annular water channel is formed between an outer wall of the cooling tube and an inner wall of the mounting hole. The inner hole and the annular water channel form a rotor cooling water channel.

18 Claims, 6 Drawing Sheets

(58) Field of Classification Search
CPC ...... H02K 11/33; H02K 5/1732; H02K 5/203; H02K 7/003; H02K 9/19; H02K 9/193
See application file for complete search history.

(56) References Cited

U.S. PATENT DOCUMENTS

| | | | | |
|---|---|---|---|---|
| 10,778,068 | B2* | 9/2020 | Murakami | H02K 9/197 |
| 2015/0280523 | A1* | 10/2015 | Tremelling | H02K 7/09 |
| | | | | 29/598 |
| 2020/0328650 | A1* | 10/2020 | Liu | H02K 5/20 |
| 2021/0376685 | A1* | 12/2021 | Hacklberger | H02K 5/203 |
| 2022/0065309 | A1* | 3/2022 | Yang | B60K 11/02 |
| 2022/0399770 | A1* | 12/2022 | Tardy | H02K 21/14 |
| 2023/0129714 | A1* | 4/2023 | Xiang | B66F 9/07595 |
| | | | | 475/150 |

FOREIGN PATENT DOCUMENTS

| | | |
|---|---|---|
| CN | 107379959 A | 11/2017 |
| CN | 207677552 U | 7/2018 |
| CN | 108667228 A | 10/2018 |
| CN | 111654162 A | 9/2020 |
| DE | 102017102151 A1 | 8/2018 |
| JP | H07170694 A | 7/1995 |
| JP | 2003322082 A | 11/2003 |
| JP | 2007028845 A | 2/2007 |
| JP | 2010081657 A | 4/2010 |
| JP | 2010239799 A | 10/2010 |
| JP | 2015059715 A | 3/2015 |
| JP | 2016067117 A | 4/2016 |
| JP | 2017139872 A | 8/2017 |
| JP | 2019193452 A | 10/2019 |
| JP | 2020162198 A | 10/2020 |
| JP | 2020162338 A | 10/2020 |

* cited by examiner

COOLING STRUCTURE OF INTEGRATED ELECTRIC DRIVE SYSTEM AND INTEGRATED ELECTRIC DRIVE SYSTEM

CROSS-REFERENCE TO RELATED APPLICATIONS

This application is a Continuation application of International Patent Application No. PCT/CN2021/127073, filed on Oct. 28, 2021, which is based on and claims priority to and benefits of Chinese Patent Application No. 202011195481.8, filed on Oct. 30, 2020. The entire content of all of the above-referenced applications is incorporated herein by reference.

FIELD

The present disclosure relates to the field of cooling technology for automobile electric drive systems, and more specifically, to a cooling structure for a drive system and an integrated electric drive system.

BACKGROUND

An electric drive system is a component of an electric vehicle. With the continuous development of new energy vehicles, there are increasingly high requirements for the arrangement of the vehicle driving system. The electric drive system is composed of components such as a driving motor, a controller, and a transmission. The heating component in the controller may dissipate a lot of heat during the operation, and the stator and the rotor of the motor may also dissipate a lot of heat during the operation. In the related art, multiple cooling water channels are arranged in the electric drive system to dissipate the heat, but the heat dissipation effect of the cooling water channels in the related art is often not satisfying, which leads to a low heat dissipation rate and the poor cooling effect of the controller and the motor in the electric drive system.

SUMMARY

In order to solve the technical problems such as the low heat dissipation rate and the poor cooling effect existing in a cooling water channel of an electric drive system in the related art, the present disclosure provides a cooling structure for an integrated electric drive system and an integrated electric drive system.

In a first aspect of the present disclosure, a cooling structure a drive system provided in an embodiment of the present disclosure includes a motor assembly. The motor assembly includes a rotary shaft and a cooling tube having an inner hole. The rotary shaft includes a mounting hole for receiving the cooling tube. An annular water channel is formed between an outer wall of the cooling tube and an inner wall of the mounting hole. The inner hole and the annular water channel form a rotor cooling water channel.

In an embodiment of the present disclosure, the rotary shaft includes a middle rotor, and a first rotor and a second rotor respectively connected with two opposite ends of the middle rotor. The mounting hole includes a first through hole in the first rotor and a second through hole in the middle rotor. The first through hole is in communication with the second through hole.

In an embodiment of the present disclosure, the middle rotor further includes multiple branch grooves circumferentially disposed at intervals around the second through hole. The multiple branch grooves are in communication with the second through hole.

In an embodiment of the present disclosure, a diameter of the inner hole decreases in a first direction, and the first direction is from an input end of the inner hole through which a cooling liquid flows in to an output end of the inner hole from which the cooling liquid flows out.

A cross-sectional area of the annular water channel perpendicular to an axis of the rotary shaft decreases in a second direction, and the first direction is opposite to the second direction.

In an embodiment of the present disclosure, the cooling structure for an integrated electric drive system further includes a controller housing mounted to the motor assembly. The controller housing includes a controller cooling water channel. The controller housing includes a stator cooling water channel. The inner hole is in communication with the controller cooling water channel, and the annular water channel is in communication with the stator cooling water channel.

In an embodiment of the present disclosure, the motor assembly includes a motor housing. The rotary shaft is mounted in the motor housing. The controller housing is mounted to the motor housing. The stator cooling water channel is disposed on the motor housing.

In an embodiment of the present disclosure, two opposite ends of the controller cooling water channel respectively include a water channel inlet and a water channel outlet.

The motor assembly further includes a cover plate and an end cover configured to mount the rotary shaft on the motor housing. The end cover is mounted to the motor housing, and the cover plate is mounted to a surface of the end cover away from the motor housing.

A connecting water channel is disposed on the cover plate. A first communication channel, a second communication channel, and a third through hole in communication with the mounting hole are disposed on the end cover. A first end of the cooling tube is mounted to the cover plate, and a second end of the cooling tube passes through the third through hole and is inserted into the mounting hole. The annular water channel is in communication with the stator cooling water channel through the first communication channel. The controller cooling water channel is in communication with the inner hole through the second communication channel and the connecting water channel in sequence.

In an embodiment of the present disclosure, the motor assembly further includes a mechanical seal. The mechanical seal includes a movable ring and a stationary ring fixed to an inner side wall of the third through hole. The movable ring is sleeved on the rotary shaft and rotates with the rotary shaft, and the stationary ring is sleeved on the movable ring and connected with the movable ring.

In an embodiment of the present disclosure, the stator cooling water channel includes multiple straight water channels disposed at intervals on the motor housing, and multiple transition water channels in communication with two adjacent straight water channels.

In the present disclosure, the cooling tube having the inner hole is inserted into the mounting hole of the rotary shaft. An annular water channel is formed between an outer wall of the cooling tube and an inner wall of the mounting hole. The inner hole and the annular water channel form a rotor cooling water channel of the motor assembly, and the inner hole is in communication with the annular water channel, so that the cooling liquid flows in through the inner hole of the cooling tube, flows through the whole inner hole and the annular water channel in sequence, and then flows out from the annular water channel. During the flow of the cooling liquid, the cooling liquid flows in opposite directions in the inner hole and the annular water channel.

An embodiment of the present disclosure further provides an integrated drive system, including the above cooling structure for an integrated electric drive system.

BRIEF DESCRIPTION OF THE DRAWINGS

In order to describe the technical solutions of the present disclosure more clearly, the accompanying drawings to be used in implementations are briefly described below.

The reference numerals in the specification are as follows: 1: Motor assembly; 11: Stator cooling water channel; 12: Rotor cooling water channel; 13: Water channel outlet; 14: Motor housing; 15: Rotary shaft; 151: Mounting hole; 152: Middle rotor; 1521: Second through hole; 1522: Branch groove; 153: First rotor; 1531: First through hole; 154: Second rotor; 155: Output gear; 16: Cooling tube; 161: Inner hole; 17: Annular water channel; 18: Cover plate; 181: Connecting water channel; 19: End cover; 191: First communication channel; 192: Second communication channel; 193: Third through hole; 100: Mechanical seal; 2: Controller housing; 21: Electric control cooling water channel; 22: Water channel inlet; 23: Electric control water channel outlet; and 3: Speed reducer.

DETAILED DESCRIPTION

In order to make the technical problems, technical solutions, and beneficial effects to be solved in the present disclosure clearer, the present disclosure is further described in detail below with reference to the accompanying drawings and embodiments. It should be understood that the specific embodiments described herein are merely used to explain the present disclosure but not to limit the present disclosure.

It should be understood that orientation or position relationships indicated by the terms such as "up", "down", "left", "right", "front", "back", and "middle" are based on orientation or position relationships shown in the accompanying drawings, and are used only for ease of description of the present disclosure and brevity of the description, rather than indicating or implying that the mentioned apparatus or element need to have a particular orientation or be constructed and operated in a particular orientation. Therefore, such terms should not be construed as a limitation on the present disclosure.

Figure 2:
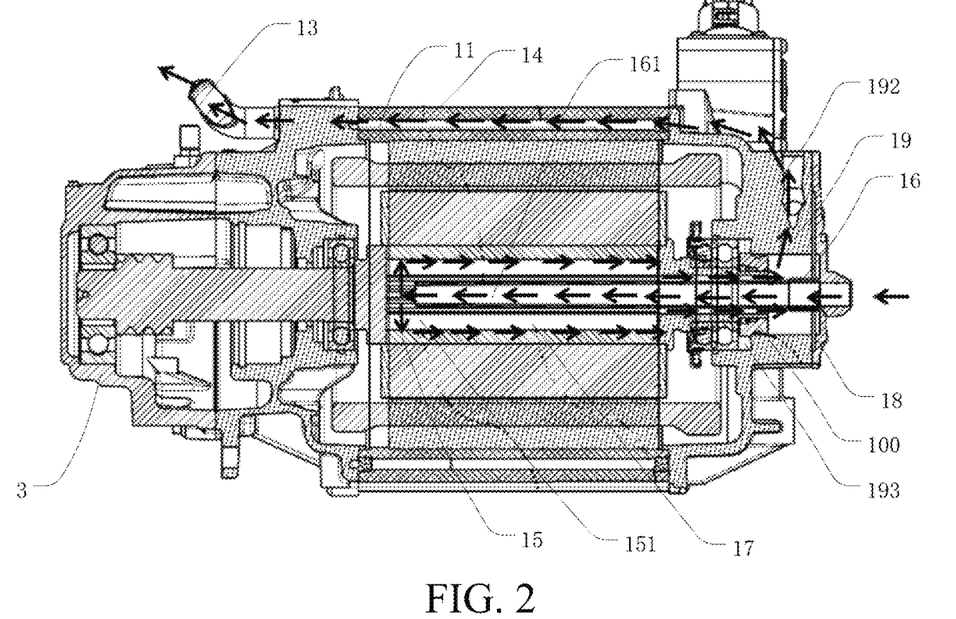
FIG. 2 is a cross-sectional view of a cooling structure for an integrated electric drive system according to an embodiment of the present disclosure.

In the present disclosure, in order to better show the structure of the cooling structure for an integrated electric drive system and the connection relationship thereof, a "head end" refers to an end away from the motor assembly (that is, the right end in FIG. 2), and a tail end refers to an end pointing to the motor assembly (that is, the left end in FIG. 2).

Figure 9:
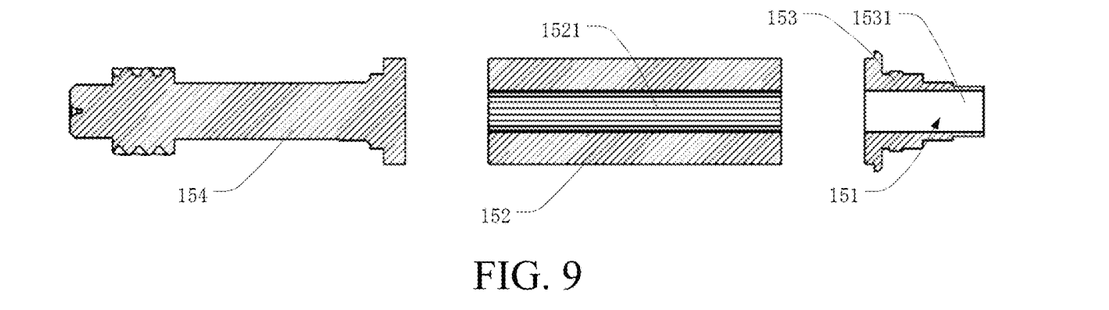
FIG. 9 is a cross-sectional view of a rotary shaft of a cooling structure for an integrated electric drive system according to an embodiment of the present disclosure.

As shown in FIG. 2 and FIG. 9, in an embodiment of the present disclosure, a cooling structure for an integrated electric drive system includes a motor assembly 1. The motor assembly 1 includes a rotary shaft 15 and a cooling tube 16 having an inner hole 161. A mounting hole 151 for the cooling tube to be inserted is arranged in the rotary shaft 15. An annular water channel 17 is formed between an outer wall of the cooling tube 16 and an inner wall of the mounting hole 151. The inner hole 161 and the annular water channel 17 are constructed into a rotor cooling water channel 12.

In the present disclosure, the cooling tube 16 having the inner hole 161 is inserted into the mounting hole 151 of the rotary shaft 15. The annular water channel 17 is formed between the outer wall of the cooling tube 16 and the inner wall of the mounting hole 151. The inner hole 161 and the annular water channel 17 are constructed into a rotor cooling water channel 12 of the motor assembly 1, and the inner hole 161 is in communication with the annular water channel 17, so that the cooling liquid flows in through the inner hole 161 of the cooling tube 16, flows through the whole inner hole 161 and the annular water channel 17 in sequence, and then flows out from the annular water channel 17. The cooling liquid flows in opposite directions in the inner hole 161 and the annular water channel 17.

Through the coupling design of the mounting hole 151 of the rotary shaft 15 and the inner hole 161 of the cooling tube 16, the cooling liquid can flow into the inner hole 161 with a small flow, and after flowing into the annular channel 17, the cooling liquid with the small flow contacts the inner wall of the mounting hole 151 with the maximum contact area to cool the rotary shaft 15 and the rotor to the greatest extent, thereby enhancing the cooling effect of the cooling liquid on the rotary shaft 15 and the stator in the rotor cooling water channel 12. In this way, it can be ensured that the cooling liquid with a small flow in the inner hole 161 and the annular water channel 17 can fully absorb the heat released by the rotary shaft 15 and the rotor of the motor assembly 1, thereby improving the heat dissipation efficiency of the cooling structure for the integrated electric drive system and prolonging the service life of the motor assembly 1.

Figure 8:
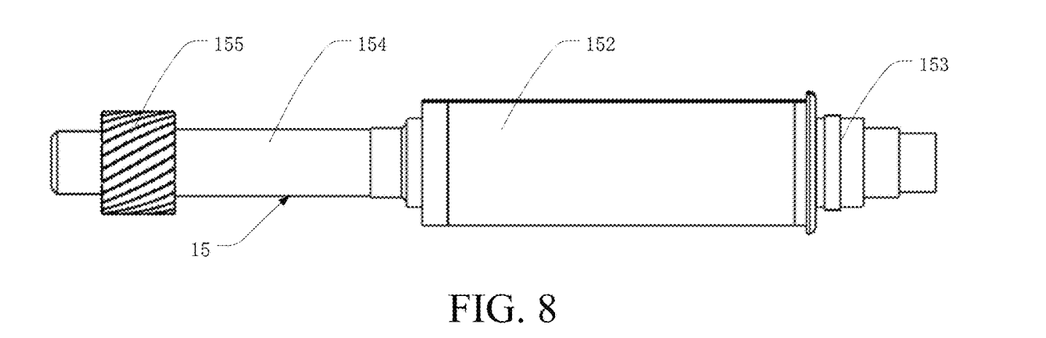
FIG. 8 is a schematic structural diagram of a rotary shaft of a cooling structure for an integrated electric drive system according to an embodiment of the present disclosure.

In an embodiment, as shown in FIG. 8 to FIG. 9, the rotary shaft 15 includes a middle rotor 152, and a first rotor 153 and a second rotor 154 connected with two opposite ends of the middle rotor 152. The mounting hole 151 includes a first through hole 1531 in the first rotor 153 and a second through hole 1521 in the middle rotor 152. The first through hole 1531 is in communication with the second through hole 1521. It may be understood that the first rotor 153, the second rotor 154, and the middle rotor 152 may be connected together by welding. In an embodiment of the present disclosure, the first rotor 153, the second rotor 154, and the middle rotor 152 are connected together by friction welding. In the friction welding, splines may not need to be arranged between the first rotor 153 and the middle rotor 152 and between the second rotor 154 and the middle rotor 152. In addition, through the friction welding, a diameter of the second through hole 1521 may be greater than a diameter of the first through hole 1531, thereby increasing the contact area between the cooling liquid and the middle rotor 152 and improving the cooling efficiency of the rotary shaft 15. In the present disclosure, the rotary shaft 15 is designed with a three-section mechanism, and the structure of each section of the rotor is simple and easy to process, thereby reducing the manufacturing cost of the cooling structure for the integrated electric drive system.

It should be noted that the first rotor 153 and the middle rotor 152 mainly play the role of rotary drive, that is, a large amount of heat may be generated on the first rotor 153 and the middle rotor 152 during the operation of the motor assembly 1. However, the second rotor 154 mainly transmits the rotation of the motor assembly 1 to a transmission mechanism such as a speed reducer, and the second rotor 154 generates less heat during the operation of the motor assembly 1. Therefore, the first rotor 153 and the middle rotor 152 are provided with the mounting hole 151 for the cooling liquid to circulate, to achieve the effect of cooling the first rotor 153 and the middle rotor 152. The second rotor 154 does not need to be provided with the mounting hole 151.

Figure 10:
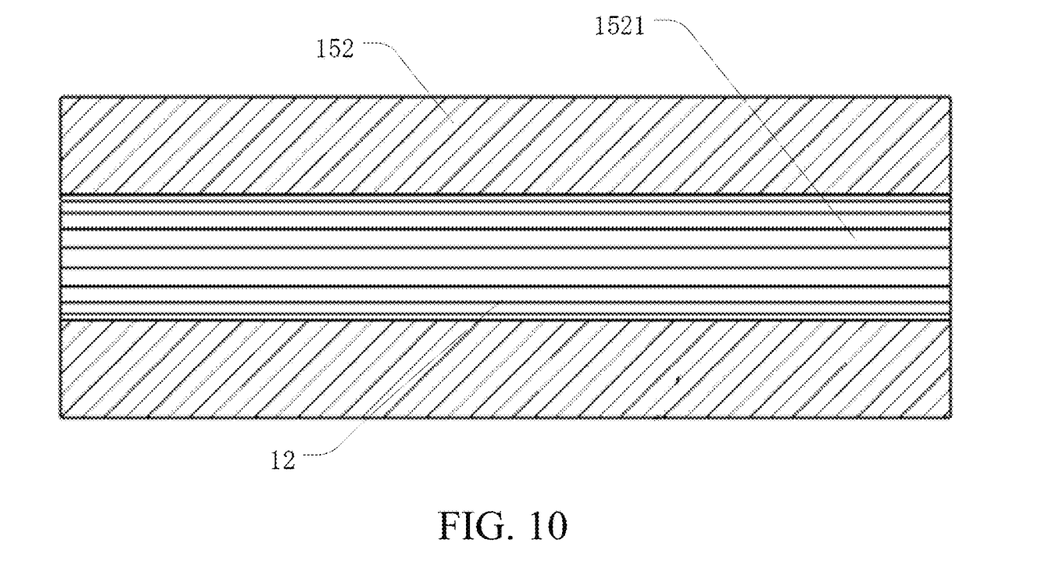
FIG. 10 is a cross-sectional view of a middle rotor of a cooling structure for an integrated electric drive system according to an embodiment of the present disclosure.
Figure 11:
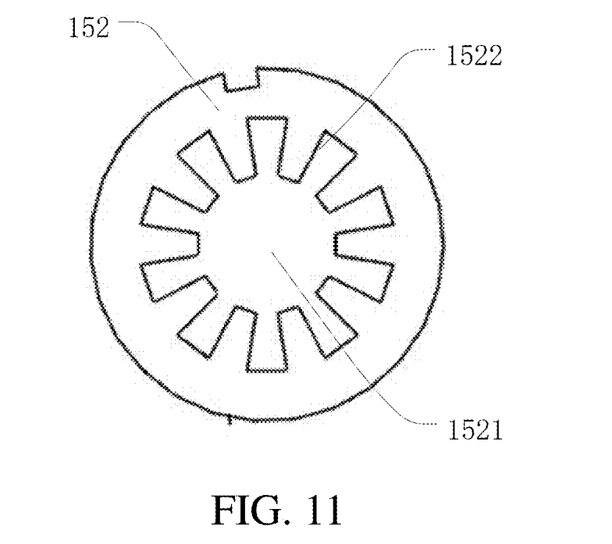
FIG. 11 is a top view of a middle rotor of a cooling structure for an integrated electric drive system according to an embodiment of the present disclosure.

In an embodiment, as shown in FIG. 10 and FIG. 11, the middle rotor 152 further includes multiple branch grooves 1522 circumferentially arranged at intervals around the second through hole 1521. The multiple branch grooves 1522 are all in communication with the second through hole 1521. It may be understood that the number of the branch grooves 1522 may be configured according to the actual demand. For example, three, six, or ten branch grooves 1522 are evenly arranged on the middle rotor 152 along the circumference of the second through hole 1521. The design of the branch grooves 1522 increases the contact area between the cooling liquid and the middle rotor 152, thereby improving the heat dissipation efficiency of the middle rotor 152.

Figure 3:
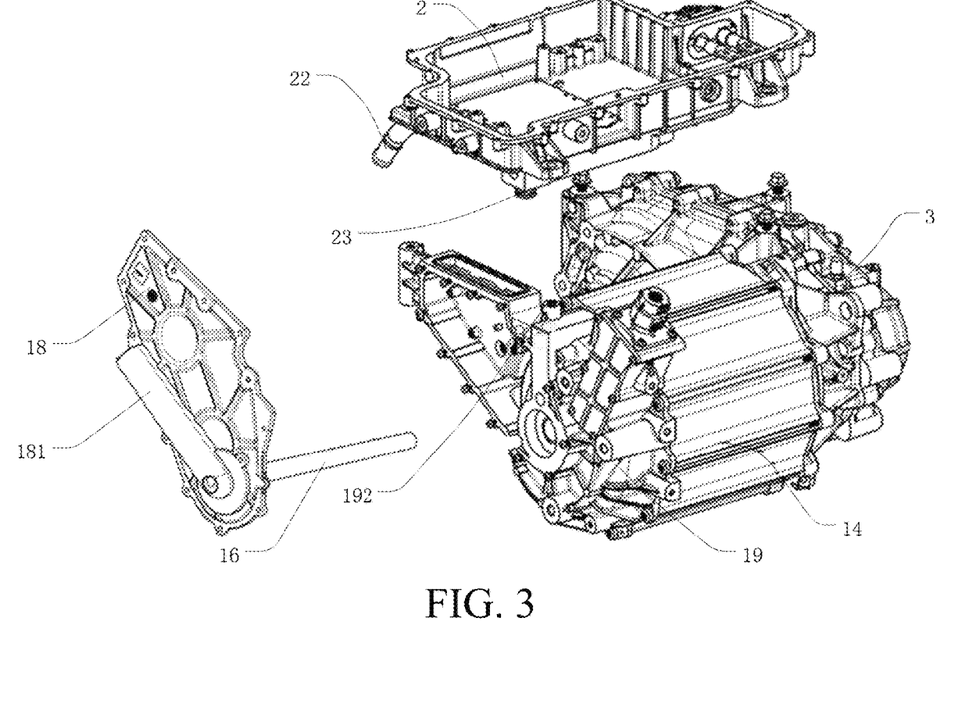
FIG. 3 is a schematic diagram of an exploded structure of a cooling structure for an integrated electric drive system according to an embodiment of the present disclosure.
Figure 4:
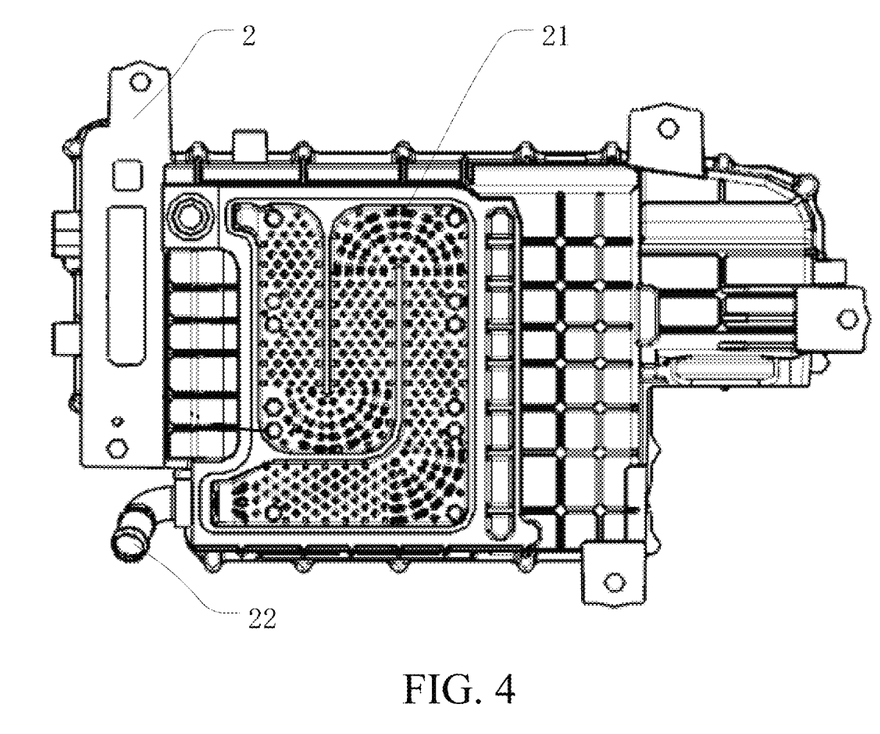
FIG. 4 is a partial schematic structural diagram of a cooling structure for an integrated electric drive system according to an embodiment of the present disclosure.
Figure 5:
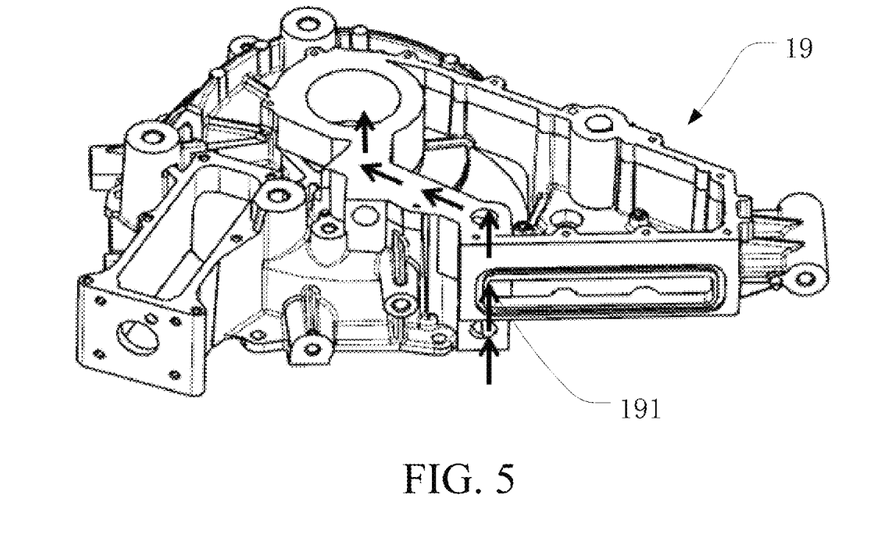
FIG. 5 is a schematic structural diagram of an end cover of a cooling structure for an integrated electric drive system according to an embodiment of the present disclosure.
Figure 6:
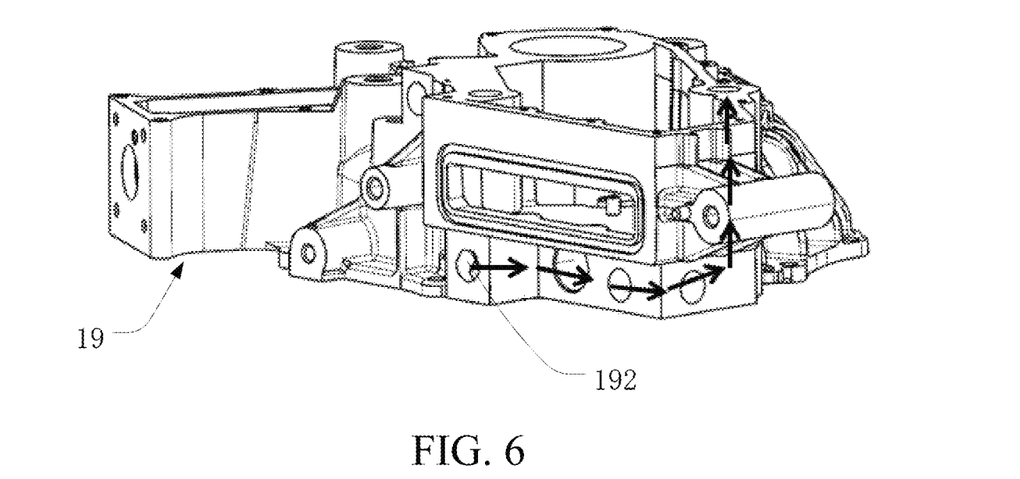
FIG. 6 is a schematic structural diagram of an end cover of a cooling structure for an integrated electric drive system according to another embodiment of the present disclosure.
Figure 7:
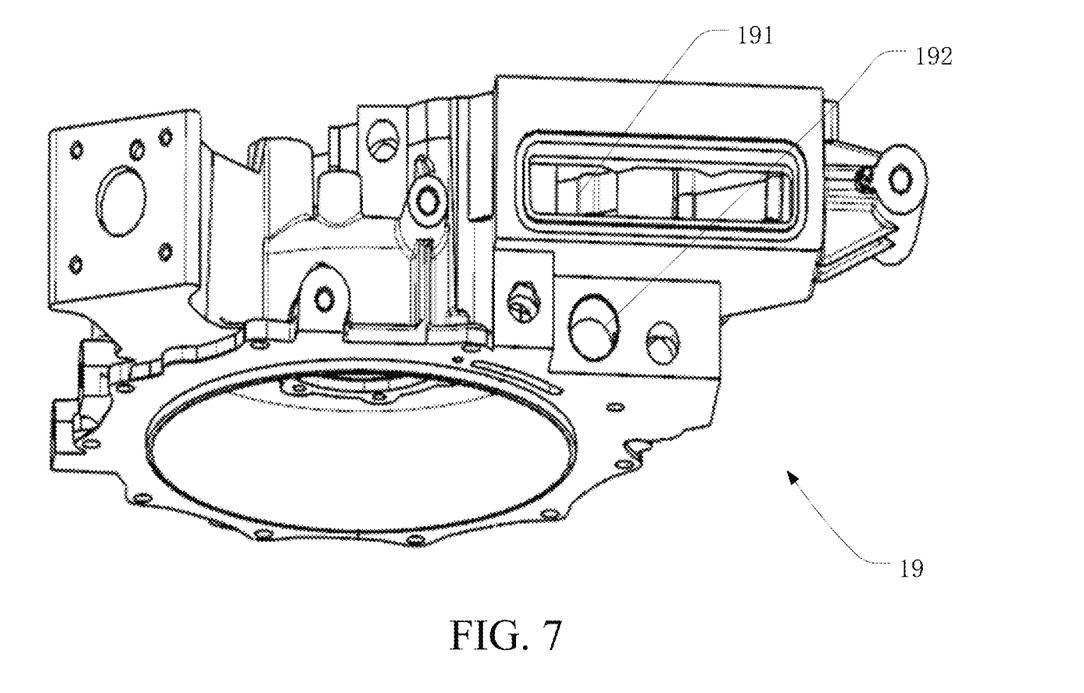
FIG. 7 is a schematic structural diagram of an end cover of a cooling structure for an integrated electric drive system according to still another embodiment of the present disclosure.

In an embodiment, as shown in FIG. 2 and FIG. 3, a diameter of the inner hole 161 (that is, an inner diameter of the cooling tube 16) gradually decreases in a first direction. The first direction is from an end of the inner hole 161 through which a cooling liquid flows in (e.g., an input end) to an end from which the cooling liquid flows out (e.g., an output end) of the inner hole 161. It may be understood that the first direction is a direction from the tail end of the motor assembly 1 to the head end of the motor assembly 1. In the schematic diagram of the explosion structure of the cooling structure for an integrated electric drive system shown in FIG. 3, the diameter of the end of the inner hole 161 close to the motor assembly 1 is larger, and the diameter of the inner hole 161 gradually decreases away from the motor assembly 1 (that is, the diameter of the end of the inner hole 161 close to the cover plate 18 is larger, and the diameter of the inner hole 161 gradually decreases in the direction away from the cover plate 18). Since the diameter of the inner hole 161 (that is, the inner diameter of the cooling tube 16) gradually decreases in the first direction, the cooling flow rate in the inner hole 161 gradually increases (that is, the flow rate of the cooling liquid in the inner hole 161 is accelerated), thereby improving the cooling efficiency of the cooling liquid in the inner hole 161 on the rotary shaft 15.

The cross-sectional area (that is, the area between the outer diameter of the cooling tube 16 and inner diameter of the mounting hole 151) of the annular water channel 17 perpendicular to an axis of the rotary shaft 15 gradually decreases in a second direction. The second direction is from an end of the annular water channel 17 through which the cooling liquid flows in to an end from which the cooling liquid flows out. The first direction is opposite to the second direction. It may be understood that the second direction is a direction from the head end of the motor assembly 1 to the tail end of the motor assembly 1. In the cross-sectional view of the cooling structure for an integrated electric drive system shown in FIG. 2, the cross-sectional area of the annular water channel 17 close to the motor assembly 1 is relatively small, and the cross-sectional area of the annular water channel 17 gradually increases alone the direction away from the motor assembly 1. Since the cross-sectional area of the annular water channel 17 gradually decreases in the second direction (that is, the cross-sectional area of the annular water channel 17 close to the cover plate 18 is smaller, and the cross-sectional area of the annular water channel 17 gradually increases alone the direction away from the end of the cover plate 18), the flow rate of the cooling liquid flowing into the annular water channel 17 through the inner hole 161 will gradually increases (that is, the flow rate of the cooling liquid in the annular water channel 17 is accelerated). The fast flowing cooling liquid further increases the cooling efficiency of the rotary shaft 15, and avoids the risk of demagnetization of permanent magnet steel in the motor assembly 1 due to excessive temperature rise.

In an embodiment, as shown in FIG. 1 to FIG. 4, the cooling structure for an integrated electric drive system further includes a controller housing 2 mounted to the motor assembly 1 (through connections including screwing, welding, and the like). An electric control cooling water channel 21 is arranged on the controller housing 2. A stator cooling water channel 11 is arranged on the motor assembly 1. The inner hole 161 is in communication with the electric control cooling water channel 21, and the annular water channel 17 is in communication with the stator cooling water channel 11. It may be understood that a water channel inlet 22 in communication with the electric control cooling water channel 21 is further arranged on the controller housing 2, and a water channel outlet 13 in communication with the stator cooling water channel 11 is further arranged on the motor assembly 1. The controller housing 2 is configured for mounting the motor controller, a vehicle controller, an on-board charger, a DC converter, and the like, and heat-generating components (for example, insulated gate bipolar transistors) in the controller housing 2 are snugly attached to the electric control cooling water channel 21, so that the electric control cooling water channel 21 can more easily absorb the heat dissipated by the heat-generating components in the controller. In an embodiment of the present disclosure, the stator cooling water channel 11 is configured to absorb the heat released by a motor housing 14 of the motor assembly 1, and the rotor cooling water channel 12 is configured to absorb the heat released by the rotary shaft 15 of the motor assembly 1.

The cooling liquid flowing in through the water channel inlet 22 flows through the electric control cooling water channel 21, the rotor cooling water channel 12, and the stator cooling water channel 11 in sequence, and then flows out from the water channel outlet 13. In an embodiment of the present disclosure, the cooling liquid absorbs the heat released by the controller in the electric control cooling water channel 21, absorbs the heat released by the rotary shaft 15 and the rotor of the motor assembly 1 in the rotor cooling water channel 12, absorbs the heat released by the motor housing 14 and the stator of the motor assembly 1 in the stator cooling water channel 11, and then flows out from the water channel outlet 13.

In an embodiment of the present disclosure, the cooling liquid flowing in through the water channel inlet 22 flows through the electric control cooling water channel 21, the rotor cooling water channel 12, and the stator cooling water channel 11 in sequence, and then flows out from the water channel outlet 13. In this way, the electric control cooling water channel 21, the rotor cooling water channel 12, and the stator cooling water channel 11 are in communication in sequence, and the cooling liquid enters the electric control cooling water channel 21 through the water channel inlet 22, flows into the inner hole 161, and then flows into the annular water channel 17 from the inner hole 161 after absorbing the heat released by the controller in the electric control cooling water channel 21. That is, the cooling liquid flows into the rotor cooling water channel 12 and absorbs the heat released by the motor rotary shaft 15, flows into the stator cooling water channel 11 and absorbs the heat of the motor housing 14, and then flows out from the water channel outlet 13. The cooling structure for an integrated electric drive system connects the electric control cooling water channel 21, the rotor cooling water channel 12, and the stator cooling water channel 11 in series, so that the three cooling water channels (the electric control cooling water channel 21, the rotor cooling water channel 12, and the stator cooling water channel 11) have the same cooling liquid flow, which improves the cooling efficiency and cooling effect of the cooling liquid, that is, the cooling efficiency of the controller, the motor stator, and the motor rotor. In addition, the cooling structure for an integrated electric drive system integrates the motor assembly 1 and the controller housing 2, thereby improving the integration of the cooling structure for an integrated electric drive system, and reducing the mounting space of the cooling structure for an integrated electric drive system in an automobile. Moreover, the cooling structure for an integrated electric drive system is simple in structure and low in manufacturing cost.

Figure 1:
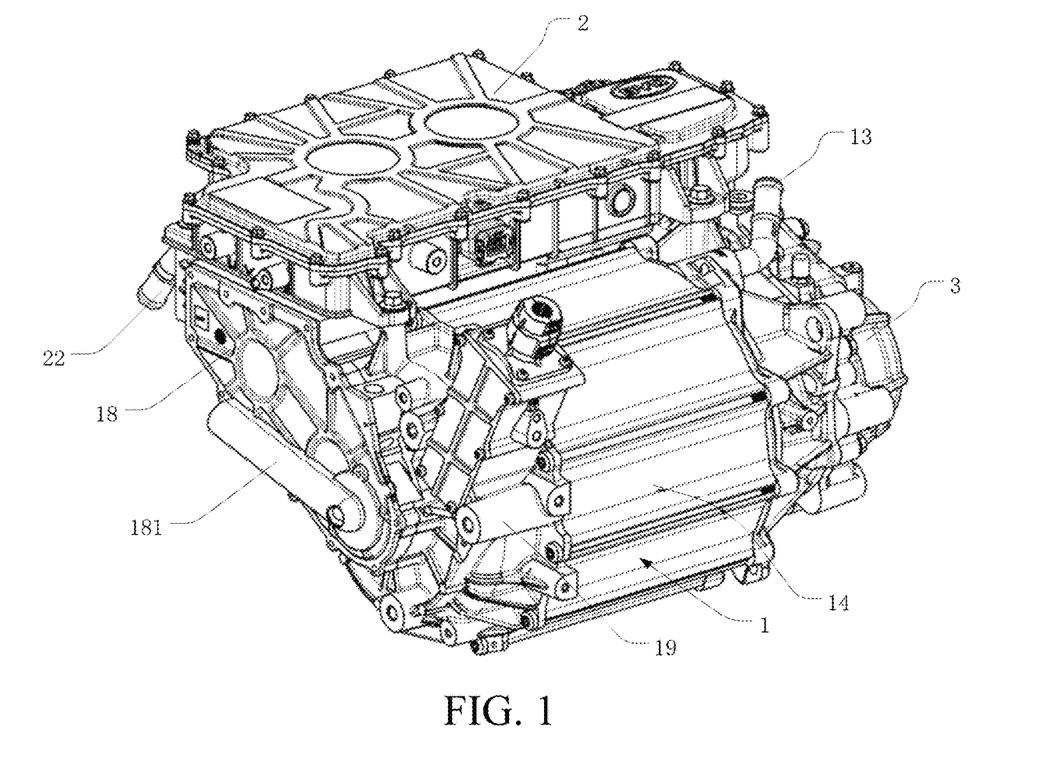
FIG. 1 is a schematic structural diagram of a cooling structure for an integrated electric drive system according to an embodiment of the present disclosure.

In an embodiment, as shown in FIG. 1 to FIG. 3, the motor assembly 1 includes a motor housing 14. The rotary shaft 15 is mounted in the motor housing 14. The controller housing 2 is mounted to the motor housing 14 (through screw connection). The stator cooling water channel 11 is arranged on the motor housing 14. In an embodiment of the present disclosure, the cooling liquid flowing out from the electric control cooling water channel 21 first enters the rotor cooling water channel 12 and absorbs the heat released by the rotary shaft 15 and the rotor, then flows into the stator cooling water channel 11 and absorbs the heat released by the motor housing 14 and the stator, and then flows out from the water channel outlet 13. Therefore, the cooling liquid in the rotor cooling water channel 12 and the stator cooling water channel 11 can absorb the heat released by the motor assembly 1, thereby ensuring the normal operation of the motor assembly 1 and prolonging the service life of the motor assembly 1.

In an embodiment, as shown in FIG. 2 and FIG. 3, the motor assembly 1 further includes a cooling tube 16 having an inner hole 161. A mounting hole 151 for the cooling tube 16 to be inserted is arranged on the rotary shaft 15. An annular water channel 17 is formed between an outer wall of the cooling tube 16 and an inner wall of the mounting hole 151. One end of the inner hole 161 is in communication with the electric control cooling water channel 21, and the other end of the inner hole 161 is in communication with the annular water channel 17. The inner hole 161 and the annular water channel 17 form the rotor cooling water channel 12. It may be understood that the cooling tube 16 is in clearance fit with the mounting hole 151, and the cooling tube 16 remains stationary during the rotation of the rotary shaft 15.

The cooling liquid flowing in through the electric control cooling water channel 21 flows through the inner hole 161 and the annular water channel 17 in sequence and then flows into the stator cooling water channel 11. In an embodiment of the present disclosure, the cooling liquid flows from the inner hole 161, flows out from the end of the cooling tube 16, and flows into the annular water channel 17. The cooling liquid flows along the axis of the rotary shaft 15 in the annular water channel 17, and then enters the stator cooling water channel 11. In the present disclosure, the rotor cooling water channel 12 includes the inner hole 161 and the annular water channel 17, and the cooling liquid flows in the inner hole 161 and the annular water channel 17 in opposite directions, thereby further enhancing the cooling effect of the cooling liquid on the rotary shaft 15 in the rotor cooling water channel 12 and further prolonging the service life of the motor assembly 1.

In an embodiment, as shown in FIG. 2 and FIG. 3, two opposite ends of the electric control cooling water channel 21 are respectively provided with a water channel inlet 22 and an electric control water channel outlet 23. In an embodiment of the present disclosure, the electric control water channel outlet 23 and the water channel outlet 13 are arranged closer to the motor assembly 1.

The motor assembly 1 further includes a cover plate 18 and an end cover 19 configured to mount the rotary shaft 15 on the motor housing 14. The end cover 19 is mounted (by connections including screwing, welding, and the like) on the motor housing 14, and the cover plate 18 is mounted (by connections including screwing, welding, and the like) on an end of the end cover 19 away from the motor housing 14. It may be understood that the end cover 19 is mounted at the rear end of the motor housing 14 in the axial direction of the rotary shaft 15.

A connecting water channel 181 is arranged on the cover plate 18. A first communication channel 191, a second communication channel 192, and a third through hole 193 in communication with the mounting hole 151 are arranged on the end cover 19. One end of the cooling tube 16 is mounted to the cover plate 18, and the other end of the cooling tube 16 passes through the third through hole 193 and is inserted into the mounting hole 151. The annular water channel 17 is in communication with the stator cooling water channel 11 through the first communication channel 191. The electric control cooling water channel 21 is in communication with the inner hole 161 through the second communication channel 192 and the connecting water channel 181 in sequence. It may be understood that when the motor housing 14 is mounted to the motor assembly 1, the electric control water channel outlet 23 is sealed with and connected with the second communication channel 192, so that the cooling liquid flowing out from the electric control water channel outlet 23 flows into the inner hole 161 through the second communication channel 192, the cooling liquid in the inner hole 161 flows into the first communication channel 191 through the annular water channel 17, and then the cooling liquid in the first communication channel 191 flows into the stator cooling water channel 11. After the stator cooling water channel 11 absorbs the heat released by the motor housing 14, the cooling liquid flows out from the water channel outlet 13. In the present disclosure, the cooling structure for an integrated electric drive system is simple in the process technology and low in the manufacturing cost.

In an embodiment, as shown in FIG. 2, the motor assembly 1 further includes a mechanical seal 100. The mechanical seal 100 includes a movable ring and a stationary ring fixed to an inner side wall of the third through hole 193. The movable ring is sleeved on the rotary shaft 15 and rotates with the rotary shaft 15, and the stationary ring is sleeved on the movable ring and rotatably connected with the movable ring. In an embodiment of the present disclosure, two opposite ends of the rotary shaft 15 are mounted in the motor housing 14 respectively through a first bearing and a second bearing. Since the rotary shaft 15 is operating at a high speed, to ensure that the cooling liquid in the annular water channel 17 does not leak out, the mechanical seal 100 is mounted at one end of the rotary shaft 15 close to the end cover 19, the movable ring of the mechanical seal 100 can rotate with the rotary shaft 15, and the stationary ring of the mechanical seal 100 is fixed to the inner wall of the third through hole 193. Since the sealing performance can be ensured during the relative rotation of the movable ring and the stationary ring, it is ensured that the cooling liquid in the annular water channel 17 does not leak, which avoids the accident of short circuits of the motor assembly 1, and prolongs the service life of the cooling structure for an integrated electric drive system.

Figure 12:
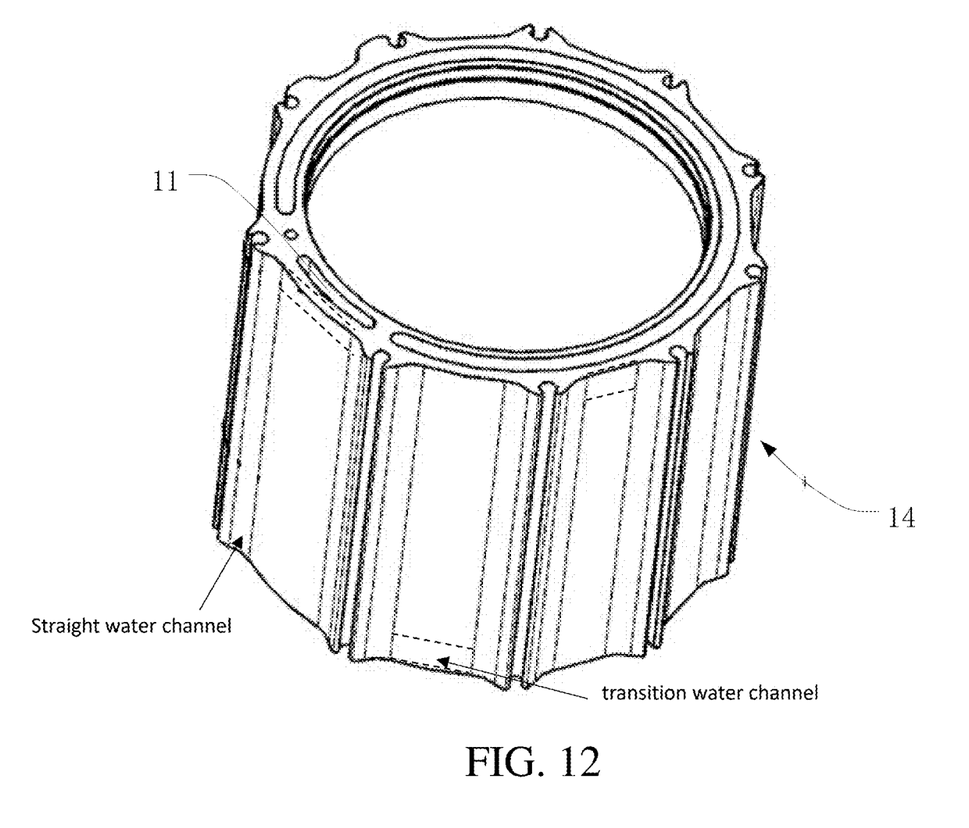
FIG. 12 is a schematic structural diagram of a motor housing of a cooling structure for an integrated electric drive system according to an embodiment of the present disclosure.

In an embodiment, as shown in FIG. 12, the stator cooling water channel 11 includes multiple straight water channels arranged on the motor housing 14 at intervals (not shown), and multiple transition water channels in communication with two adjacent straight water channels (not shown). It may be understood that the number of the straight water channels can be configured according to actual needs, and the stator cooling water channel 11 is arranged on the motor housing 14 in an "S" shape. In addition, flow directions of the cooling liquid in two adjacent straight water channels are opposite, thereby improving the heat absorption efficiency of the cooling liquid in the straight water channels.

In an embodiment, as shown in FIG. 1 and FIG. 8, the cooling structure for an integrated electric drive system further includes a speed reducer housing mounted to the motor housing 14. An output gear 155 is arranged on the outer wall of the rotary shaft 15, and a speed reducer body is mounted in the motor housing 14. The speed reducer body includes a reduction gear meshed with the output gear 155. In the present disclosure, the cooling structure for an integrated electric drive system is further integrated with a speed reducer, thereby further improving the integration and reducing the mounting space of the cooling structure for an integrated electric drive system on a vehicle.

Another embodiment of the present disclosure further provides an integrated electric drive system, including the above cooling structure for an integrated electric drive system.

The embodiments of the present disclosure are described above in detail. The principles and implementations of the present disclosure are described by using examples in this specification. The descriptions of the foregoing embodiments are merely to help understand the method of the embodiments of the present disclosure.

What is claimed is:

1. A cooling structure for a drive system, the cooling structure comprising a motor assembly and a controller housing mounted to the motor assembly, wherein
   the motor assembly comprises a rotary shaft, a cooling tube having an inner hole, and a stator cooling water channel;
   the rotary shaft comprises a mounting hole for receiving the cooling tube;
   an annular water channel is formed between an outer wall of the cooling tube and an inner wall of the mounting hole, and the annular water channel is in communication with the stator cooling water channel;
   the inner hole and the annular water channel form a rotor cooling water channel;
   the controller housing comprises a controller cooling water channel; and
   the inner hole is in communication with the controller cooling water channel.

2. The cooling structure according to claim 1, wherein
   the rotary shaft comprises a middle rotor, and a first rotor and a second rotor respectively connected with two opposite ends of the middle rotor;
   the mounting hole comprises a first through hole in the first rotor and a second through hole in the middle rotor; and
   the first through hole is in communication with the second through hole.

3. The cooling structure according to claim 2, wherein the middle rotor further comprises a plurality of branch grooves circumferentially disposed at intervals around the second through hole; and the branch grooves are in communication with the second through hole.

4. The cooling structure according to claim 1, wherein
   a diameter of the inner hole decreases in a first direction, and the first direction is from an input end of the inner hole through which a cooling liquid flows in to an output end of the inner hole from which the cooling liquid flows out; and
   a cross-sectional area of the annular water channel perpendicular to an axis of the rotary shaft decreases in a second direction, and the first direction is opposite to the second direction.

5. The cooling structure according to claim 1, wherein the motor assembly comprises a motor housing; the rotary shaft is mounted in the motor housing; the controller housing is mounted to the motor housing; and the stator cooling water channel is disposed on the motor housing.

6. The cooling structure according to claim 5, wherein the stator cooling water channel comprises a plurality of straight water channels disposed at intervals on the motor housing and a plurality of transition water channels in communication with two adjacent straight water channels.

7. The cooling structure according to claim 6, wherein
   two opposite ends of the controller cooling water channel respectively comprise a water channel inlet and a water channel outlet;
   the motor assembly further comprises a cover plate and an end cover configured to mount the rotary shaft to the motor housing, the end cover is mounted to the motor housing, and the cover plate is mounted to a surface of the end cover away from the motor housing;

a connecting water channel is disposed on the cover plate;
a first communication channel, a second communication channel, and a third through hole in communication with the mounting hole are disposed on the end cover;
a first end of the cooling tube is mounted to the cover plate, and a second end of the cooling tube passes through the third through hole and is inserted into the mounting hole; and
the annular water channel is in communication with the stator cooling water channel through the first communication channel, and the controller cooling water channel is in communication with the inner hole through the second communication channel and the connecting water channel in sequence.

8. The cooling structure according to claim 7, wherein the motor assembly further comprises a mechanical seal; the mechanical seal comprises a movable ring and a stationary ring fixed to an inner side wall of the third through hole; the movable ring is sleeved on the rotary shaft and rotates with the rotary shaft; and the stationary ring is sleeved on the movable ring and connected with the movable ring.

9. An integrated electric drive system, comprising a cooling structure, wherein the cooling structure comprises a motor assembly and a controller housing mounted to the motor assembly, wherein
the motor assembly comprises a rotary shaft, a cooling tube having an inner hole, and a stator cooling water channel;
the rotary shaft comprises a mounting hole for receiving the cooling tube;
an annular water channel is formed between an outer wall of the cooling tube and an inner wall of the mounting hole, and the annular water channel is in communication with the stator cooling water channel;
the inner hole and the annular water channel form a rotor cooling water channel;
the controller housing comprises a controller cooling water channel; and
the inner hole is in communication with the controller cooling water channel.

10. The system according to claim 9, wherein
the rotary shaft comprises a middle rotor, and a first rotor and a second rotor respectively connected with two opposite ends of the middle rotor;
the mounting hole comprises a first through hole in the first rotor and a second through hole in the middle rotor; and
the first through hole is in communication with the second through hole.

11. The system according to claim 10, wherein the middle rotor further comprises a plurality of branch grooves circumferentially disposed at intervals around the second through hole; and the branch grooves are in communication with the second through hole.

12. The system according to claim 9, wherein
a diameter of the inner hole decreases in a first direction, and the first direction is from an input end of the inner hole through which a cooling liquid flows in to an output end of the inner hole from which the cooling liquid flows out; and
a cross-sectional area of the annular water channel perpendicular to an axis of the rotary shaft decreases in a second direction, and the first direction is opposite to the second direction.

13. The system according to claim 9, wherein the motor assembly comprises a motor housing; the rotary shaft is mounted in the motor housing; the controller housing is mounted to the motor housing; and the stator cooling water channel is disposed on the motor housing.

14. The system according to claim 13, wherein the stator cooling water channel comprises a plurality of straight water channels disposed at intervals on the motor housing and a plurality of transition water channels in communication with two adjacent straight water channels.

15. The system according to claim 13, wherein
two opposite ends of the controller cooling water channel respectively comprise with a water channel inlet and a water channel outlet;
the motor assembly further comprises a cover plate and an end cover configured to mount the rotary shaft to the motor housing, the end cover is mounted to the motor housing, and the cover plate is mounted to a surface of the end cover away from the motor housing;
a connecting water channel is disposed on the cover plate;
a first communication channel, a second communication channel, and a third through hole in communication with the mounting hole are disposed on the end cover;
a first end of the cooling tube is mounted to the cover plate, and a second end of the cooling tube passes through the third through hole and is inserted into the mounting hole; and
the annular water channel is in communication with the stator cooling water channel through the first communication channel, and the controller cooling water channel is in communication with the inner hole through the second communication channel and the connecting water channel in sequence.

16. The system according to claim 15, wherein the motor assembly further comprises a mechanical seal; the mechanical seal comprises a movable ring and a stationary ring fixed to an inner side wall of the third through hole; the movable ring is sleeved on the rotary shaft and rotates with the rotary shaft; and the stationary ring is sleeved on the movable ring and connected with the movable ring.

17. A vehicle comprising an integrated electric drive system, wherein the integrated electric drive system comprises a cooling structure, wherein the cooling structure comprises a motor assembly and a controller housing mounted to the motor assembly, wherein
the motor assembly comprises a rotary shaft, a cooling tube having an inner hole, and a stator cooling water channel;
the rotary shaft comprises a mounting hole for receiving the cooling tube;
an annular water channel is formed between an outer wall of the cooling tube and an inner wall of the mounting hole, and the annular water channel is in communication with the stator cooling water channel;
the inner hole and the annular water channel form a rotor cooling water channel;
the controller housing comprises a controller cooling water channel; and
the inner hole is in communication with the controller cooling water channel.

18. The vehicle according to claim 17, wherein
the rotary shaft comprises a middle rotor, and a first rotor and a second rotor respectively connected with two opposite ends of the middle rotor;

the mounting hole comprises a first through hole in the first rotor and a second through hole in the middle rotor; and the first through hole is in communication with the second through hole.

* * * * *